United States Patent [19]

Noda

[11] 4,232,842
[45] Nov. 11, 1980

[54] FISHING REEL HAVING SUPPORT FOR A DEFLECTED SPOOL SHAFT

[75] Inventor: Hideo Noda, Sakai, Japan

[73] Assignee: Shimano Industrial Company, Limited, Osaka, Japan

[21] Appl. No.: 19,144

[22] Filed: Mar. 9, 1979

[30] Foreign Application Priority Data

Mar. 14, 1978 [JP] Japan .............................. 53-33064[U]

[51] Int. Cl.³ .......................................... A01K 89/015
[52] U.S. Cl. .................................... 242/212; 242/217
[58] Field of Search .............. 242/212, 213, 214, 215, 242/216, 217, 84.1 R; 254/186 HC

[56] References Cited

U.S. PATENT DOCUMENTS

| | | | |
|---|---|---|---|
| 2,580,990 | 1/1952 | Bannister | 242/213 |
| 4,014,422 | 3/1977 | Morishita | 242/212 |
| 4,130,251 | 12/1978 | Findley | 242/84.1 R |

Primary Examiner—Billy S. Taylor
Attorney, Agent, or Firm—Stevens, Davis, Miller & Mosher

[57] ABSTRACT

A fishing reel has a spool arranged between first and second opposing side plates, a handle shaft carrying a master gear supported between the first side plate and a gear cover provided outwardly thereof, and a spool shaft carrying a pinion in mesh with the master gear supported between the second side plate and the gear cover through bearings, the first side plate being provided with support means having a support for supporting the spool shaft at an intermediate portion thereof, so that the spool shaft is normally free from the support but is supported in contact therewith when deflection occurs in the spool shaft.

5 Claims, 1 Drawing Figure

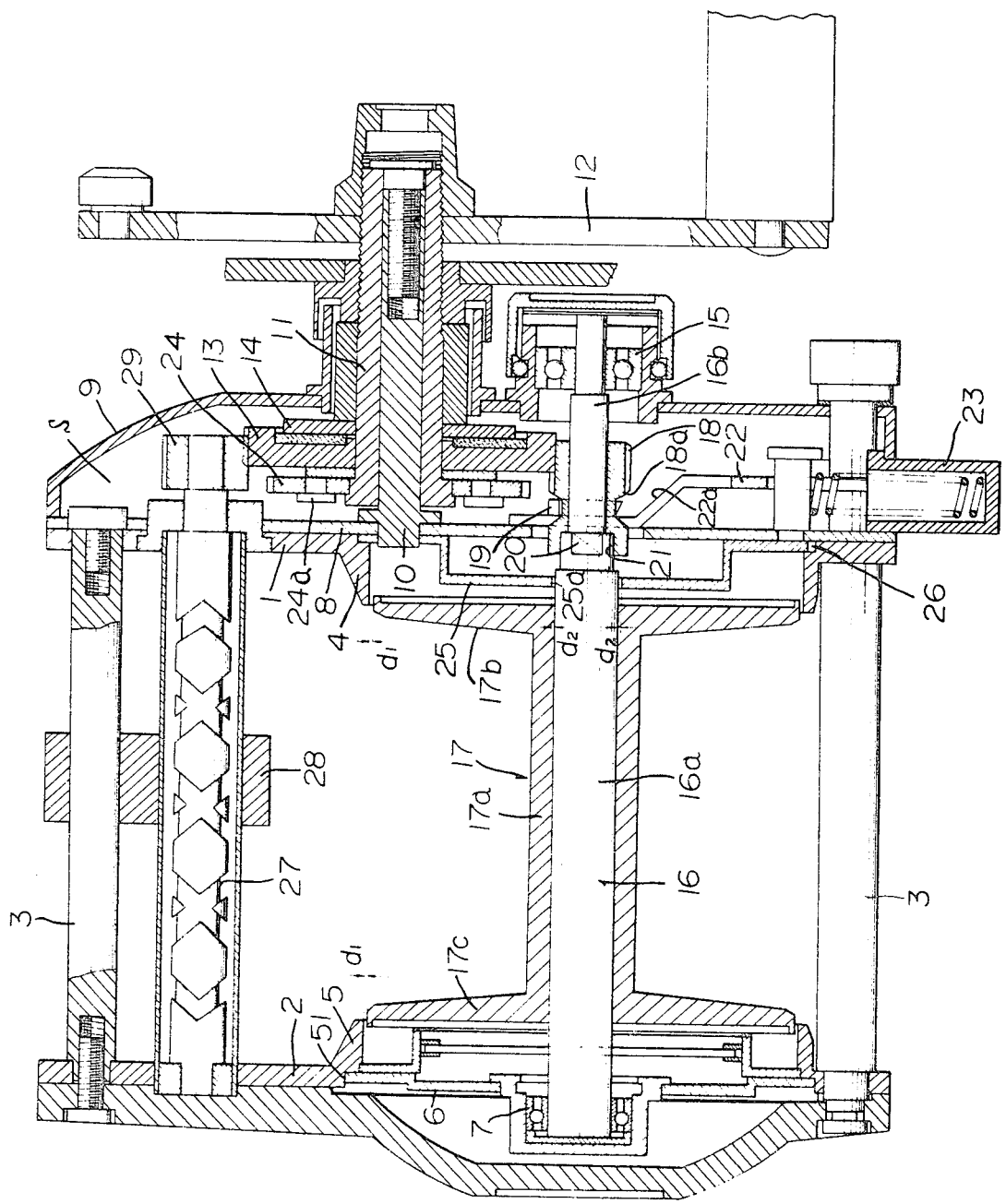

FISHING REEL HAVING SUPPORT FOR A DEFLECTED SPOOL SHAFT

This invention relates to a fishing reel, and, more particularly, to a fishing reel having a spool shaft which carries a spool fixed thereto and which is rotatably supported through a pair of bearings between a second side plate of a pair of side plates and a gear cover fixed outwardly of the first side plate of the pair.

This kind of fishing reel is generally known as a double bearing reel which has been widely used. The fishing reel is arranged so that rotation of handle bar is transmitted from a master gear fixed to a handle shaft to the spool shaft through a pinion axially slidably supported thereto, so that the spool fixed to the spool shaft may be rotated to wind a fishing line thereon. In other words, since the pinion is positioned at a substantially intermediate portion of the spool shaft, the gear cover carries one of the bearings. The spool comprises a trunk and a pair of flanges extending from both axial ends of the trunk radially outwardly thereof. The first and second side plates are provided at the inner surfaces thereof with annular frames whose inner peripheries have slightly larger diameters than outer diameters of the flanges respectively, whereby the fishing line is prevented from entering into the axial outside of each of the flanges from the trunk through the flange.

In order to increase the rotation speed of the spool for more quickly winding thereon the fishing line upon turning of the handle bar, the gear ratio of the master gear to the pinion should be made large by either enlarging the diameter of the master gear or reducing the diameter of the pinion. However, the larger master gear is undesirable as it results in an enlarging of the reel as a whole. On the other hand, the smaller diameter pinion reduces the diameter of the spool shaft. When a fish is hooked and the fishing line is subjected to an excessive load, the deflection developed at the reduced diameter spool shaft forces the flanges to abut at the outer peripheries thereof against the inner peripheries of the annular frames causing the application of an increased rotational resistance to the spool. In addition, the deflection of the spool shaft widens a gap between the outer periphery of each of the flanges and the inner periphery of each of the annular frames, whereby the fishing line slips into and is caught by the gap. The problems caused by the smaller diameter spool shaft can be eliminated by journaling the spool shaft at three points, namely, at both axial ends and at an intermediate portion. However, it is impossible to precisely coincide the axes of the bearings with each other at three points with regular intervals therebetween and thus the three-point journaling method is not practical.

This invention has been designed to overcome these problems. An object of the invention is to provide a fishing reel having a minimum increase of rotational resistance applied to be spool caused by deflection of the spool shaft even when the pinion has a reduced diameter to increase the gear ratio relative to the master gear. Another object is to prevent the fishing line from being seized by the gap between the outer periphery of each of the flanges of the spool and the inner periphery of the annular frame at each of the side plates.

The invention is characterized in that the fishing reel has a spool disposed between a pair of opposed side plates, a handle shaft for rotating the master gear, the handle shaft being supported between a first side plate of the pair and a gear cover provided outwardly of the plate, and a spool shaft having a pinion in mesh with the master gear, the spool shaft being supported between the second side plate and the gear cover through bearings, the first side plate being provided with support means having a support spaced from the spool shaft for supporting a deflected spool shaft at a substantially intermediate portion thereof, so that the spool shaft is normally free from the support but is supported in contact therewith upon deflection of the spool shaft. The support at the support means has a through hole and is preferably formed in a box-like shape, so that a gap between the inner periphery of the through hole at the support and the outer periphery of the spool shaft is smaller than the gap between the outer periphery of each of the flanges of the spool and the inner periphery of the annular frame at each of the first and second side plates.

These and other objects and novel features of the invention will become more apparent upon a reading of the following detailed specification in conjunction with the drawing.

The drawing is a longitudinal sectional view of an embodiment of the invention.

Referring to the drawing, reference numeral 1 designates a first side plate, and 2 designates a second side plate. The side plates 1 and 2 are opposite to each other at a regular interval and are connected by a plurality of connecting rods 3 in the vicinity of the respective outer peripheries of the same.

Annular frames 4 and 5, provided at the inner surface of each of the side plates 1 and 2, project axially inwardly thereof around a spool shaft 16 to thereby form respective openings. The opening at the annular frame 5 provided at the first side plate 2 has a stepped portion 51 formed axially outwardly of the same. To the stepped portion 51 is mounted a holder 6 having a first bearing 7 with which the spool shaft 16 is journaled.

Between a plate 8 attached to the first side plate 1 and a gear 9 mounted to the first side plate 1 outwardly thereof through the attached plate 8, is formed a space S within which a master gear and pinion to be herein described are arranged. A handle shaft 11 is supported rotatably through a fixed shaft 10 between the attached plate 8 and the gear cover 9, and projects at its one end outwardly of the gear cover 9 to carry a handle bar 12 fixed to the projecting end. The handle shaft 11 carries at a substantially intermediate portion thereof a master gear 13 in relation of being rotatable, and carries a friction plate 14 adjacent to the master gear 13 in relation of being non-rotatable and axially movable only so that rotation of the handle shaft 11 is transmitted to the master gear 13 through the friction plate 14.

A second bearing 15 paired with the first bearing 7 is provided substantially at the central portion of gear cover 9, so that the spool shaft 16 is journaled with both the first and second bearings 7 and 15.

The spool shaft 16 is composed of a larger diameter shaft portion 16a and a smaller diameter shaft portion 16b, the larger diameter shaft portion 16a fixedly supporting a spool 17 arranged between the first and second side plates 1 and 2.

The spool 17 comprises a trunk 17a and disc-like shaped flanges 17b and 17c each extending radially outwardly of the trunk 17a. The flanges 17b and 17c are opposite to the inner surfaces of annular frames 4 and 5, and have diameters slightly smaller than the inner diameters of the annular frames 4 and 5 respectively, so that the outer periphery of each of the flanges 17b and 17c and the inner periphery of each of the annular frames 4 and 5 are spaced by a gap $d_1$ small enough to prevent entrance of the fishing line therein.

A pinion 18 carried by the smaller diameter shaft portion 16b of the spool shaft 16 is rotatable and axially movable and in mesh with the master gear 13. At the outer periphery of the pinion 18 is provided an annular engaging groove 18a engageable with a clutch 19 carried by the attached plate 8, the clutch 19 always elastically urging the pinion 18 toward the spool 17.

Between the larger diameter shaft portion 16a and the smaller diameter shaft portion 16b is provided a first engaging portion 20 oval in section, and at one axial end of the pinion 18 is provided a second engaging portion 21 engageable with or disengageable from the first engaging portion 20, the engaging portions 20 and 21 forming a clutch means which is coupled or disconnected by sliding motion of the pinion 18 controlled by a control means therefor. The control means for the pinion 18 is composed of an actuator 22 providing a pusher 22a for pushing the clutch 19 axially outwardly of the spool shaft 16, a control element 23 for pushing the actuator 22, and a return plate 24 which is fixed to the handle shaft 11 for returning the actuator 22.

The pinion 18 is controlled in such a manner that the control element 23 pushes the actuator 22 and the pusher 22a pushes the clutch 19 to be axially outwardly moved, whereby the pinion 18 moves rightward in the drawing to disconnect the second engaging portion 21 from the first engaging portion 20. On the other hand, the handle bar 12 is turned to rotate the return plate 24, and clutch pins 24a projecting therefrom push the utmost end of actuator 22 to return the actuator 22, whereby the clutch 19 is released therefrom and urges the pinion 18 leftward, thus coupling the clutch means formed by engaging portions 20 and 21. The reel construction so far described is conventional.

The invention is directed to provide the fishing reel described with a support means which is formed at the first side plate 1 and comprises a support element 25 having a support portion 25a for supporting the spool shaft 16 at a substantially intermediate portion thereof.

The support element 25 is formed mainly of a round plate having at the center a through hole which forms the spool shaft support portion 25a, the through hole being larger in diameter than the larger diameter shaft portion 16a at the spool shaft 16. Between the support portion 25a and the outer periphery of larger diameter shaft portion 16a of the spool shaft 16 is formed a gap $d_2$ smaller than the gap $d_1$ between the inner periphery of each of the annular frames 4 and 5 and the outer periphery of each of the flanges 17b and 17c. Accordingly, the support portion 25a is not normally in contact with the spool shaft 16, but when the fishing line is subjected to an excessive external force to deflect the spool shaft 16, the support portion 25a supports the spool shaft 16 at the intermediate portion thereof. Hence, the outer peripheries of the flanges 17b and 17c are prevented from contacting with the inner perpheries of annular frames 4 and 5 respectively, and the gap $d_1$, when deflection is developed at the spool shaft 16, is kept within a maximum limit to prevent the fishing line from entering the same.

In other words, the support portion 25a bears the intermediate portion of spool shaft 16 only when deflected, so that the increase in rotational resistance applied to the spool 17 caused by deflection of the spool shaft 16 may be kept to a minimum and the fishing line may be prevented from entering the gap $d_1$ even when the spool shaft 16 is deflected.

The support 25 is inserted at its outer periphery into an annular recess 26 formed on the radially inner surface of the annular frame 4 at the first side plate 1, and is fixed by the attached plate 8. Rather than being a round plate, the support 25 may be a square plate, and is preferably formed in a box-like shape as shown to provide added strength. The support 25 may also be integrated with the first side plate 1 or with the attached plate 8.

To complete the description, reference numeral 27 designates a guide shaft journaled between the side plates 1 and 2, 28 designates a line guide carried with the guide shaft 27 and axially reciprocating thereon, and 29 designates a transmission gear in mesh with the master gear 13 to transmit the rotation of handle bar 12 to the guide shaft 27.

The fishing reel illustrated operates as follows, the control 23 is pushed to move forward the actuator 22 so that the clutch 19 and pinion 18 are axially moved to disengage the second engaging portion 21 from the first engaging portion 20 through the pusher 22a, thereby allowing the spool 17 to freely rotate. Thus, a fishing line wound onto the spool 17 is cast by means of a sinker at an end of the same. When a line is wound onto the spool 17, the handle bar 12 is turned to press the clutch pins 24a against the end of actuator 22, so that the actuator 22 is restored and the clutch 19 is released from the pusher 22a and axially moves the pinion 18 to engage the second engaging portion 21 with the first engaging portion 20, thereby transmitting the driving force from the handle bar 12 to the spool 17.

If the fishing line, when wound onto the spool 17, is subjected to an excessive force to deflect the spool shaft 16, the support portion 25a at the support 25 bears the spool shaft 16 at a substantially intermediate portion thereof to prevent the flanges 17b and 17c from contacting at the outer peripheries thereof with the inner peripheries of the annular frames 4 and 5, consequently an increase of rotational resistance applied to the spool 17, caused by the deflection of spool shaft 16, is restricted to a minimum to thereby facilitate the winding-up of the fishing line. Furthermore, the gap $d_1$ between the outer periphery of each of the flanges 17b and 17c and the inner periphery of each of the annular frames 4 and 5 is kept within an allowable distance, thereby ensuring that the fishing line is not bit at the gap $d_1$.

As clearly understood from the aforesaid description, the fishing reel of the invention is provided at the first side plate with the support for bearing an intermediate portion of a deflected spool shaft, and a gap $d_2$ is formed between the spool shaft support portion of the support and the spool shaft, the gap $d_2$ being smaller than the gap $d_1$ existing between the inner periphery of each of the annular frames and the outer periphery of each of the flanges, whereby even when a reduced diameter pinion is used to enlarge the gear ratio relative to the master gear, the increase of rotational resistance applied to the spool caused by a deflected spool shaft is restricted to a minimum thereby permitting a rapid winding of the fishing line onto the spool.

Furthermore, the gap $d_2$ is set to keep the gap $d_1$ at maximum allowed limit to prevent the line from entering into the gap $d_1$ even when deflection is developed at the spool shaft.

Also, the pinion, even if of small size, works without hindrance, thereby enabling the fishing reel to be constructed in a small size.

While an exemplary embodiment of the invention has been shown and described, the invention is not limited thereto but rather is limited solely by the appended claims.

I claim:

1. A fishing reel comprising:
   (a) a pair of opposed side plates, each of said side plates having an annular frame extending axially inwardly and being connected by a plurality of connecting rods to the other side plate at regular intervals, a second side plate of said pair having a first bearing;
   (b) a gear cover fixed at the outside of a first side plate of said pair, said gear cover and first side plate having a space therebetween, said gear cover having a second bearing;
   (c) a handle shaft rotatably supported between said first side plate and said gear cover, said handle shaft projecting outwardly of said gear cover and carrying a handle bar at the projecting end of said handle shaft;
   (d) a master gear supported to said handle shaft, said master gear being arranged within said space;
   (e) a spool shaft journaled between said first bearing and said second bearing, said spool shaft having a larger diameter shaft portion and a smaller diameter shaft portion, said larger shaft portion being journaled to said first bearing, said smaller diameter shaft portion being journaled to said second bearing and having a first engaging portion;
   (f) a spool fixed to said larger diameter shaft portion of said spool shaft, said spool comprising a trunk and a pair of flanges which extend from both axial ends of said trunk radially outwardly thereof, said flanges having slightly smaller outer diameters than the inner diameters of said annular frames, the outer periphery of said flanges opposing the inner peripheries of said annular frames;
   (g) a pinion supported to said smaller diameter shaft portion of said spool shaft to be axially slidable therealong said pinion being arranged within said space, meshed with said master gear, and provided at one axial end with a second engaging portion engageable with said first engaging portion of said spool shaft;
   (h) control means for controlling the sliding motion of said pinion; and,
   (i) support means provided at said first side plate and having a support portion supporting said spool shaft at a substantially intermediate portion thereof, said support portion of said support means being adapted to be normally free from said spool shaft but to support said spool shaft by contact therewith when said spool shaft deflects a predetermined amount.

2. A fishing reel according to claim 1, wherein said support means comprises a support body having a through hole of a slightly larger diameter than an outer diameter of said larger diameter shaft portion of said spool shaft, so that when deflection is developed at said spool shaft said spool shaft contacts with the periphery of said through hole and is supported thereby.

3. A fishing reel according to claim 2, wherein a gap exists between the periphery of said through hole and the outer periphery of said larger diameter shaft portion of said spool shaft which is smaller than a gap which exists between the outer periphery of said flange at said spool and the inner periphery of an associated annular frame.

4. A fishing reel according to claim 2, wherein said support body has a box-like shape.

5. A fishing reel according to claim 1, wherein said support portion of said support means is located at said larger diameter shaft portion of said spool shaft, so that when deflection is developed at said spool shaft said support portion contacts with and supports said larger diameter shaft portion.

* * * * *